UNITED STATES PATENT OFFICE 1,959,503

MANUFACTURE OF HYDRAZINE

Otto Seuffert and Egon Ihwe, Darmstadt, Germany

No Drawing. Application October 24, 1932, Serial No. 639,379. In Austria December 28, 1931

9 Claims. (Cl. 23—190)

This invention relates to the manufacture of hydrazine from urea by treatment with chlorine in the presence of an aqueous solution of an alkaline reacting substance, according to the Hofmann decomposition which is described for example in Bernthsen, Kurzes Lehrbuch der organischen Chemie, 1921, pages 215 and 216. This decomposition of urea is in practice carried out with alkali metal hypochlorite, which is formed, when reacting chlorine with an aqueous solution of an alkaline reacting substance, such as sodium or potassium hydroxide and the like.

The main object of the invention is to obtain with simple and cheap means an increased yield of hydrazine by the so-called Hofmann decomposition of urea and this object is obtained by carrying out this decomposition in presence of protective colloids capable of swelling with water, such as albumin, glue, gelatine, agar-agar or their colloidal decomposition products.

Example 30 g. of urea are added to 50 g. of sodium hydroxide in 120 ccm. of water at a temperature of about 0° C. 1 g. of glue dissolved in 10 ccm. of water is added to this mixture and 37 g. of sodium hypochlorite in 250 ccm. of water are added to the reaction mixture, which is then heated to about 100° C. The reaction mixture is cooled, the hydrazine formed precipitated with an excess of diluted sulfuric acid and the precipitated hydrazine sulfate separated from the liquid. 39 to 42 g. of hydrazine sulfate are obtained, which corresponds to a yield of 60 to 65% of the theoretical.

The same good results are obtained when replacing the glue by gelatine.

When working under the same conditions but in absence of glue or any other protective colloid capable of swelling with water the yield in hydrazine sulfate amounts to only 5 to 6 g., which is about 8 to 10% of the theoretical.

We claim:

1. A method for making hydrazine which consists in treating urea with an alkali metal hypochlorite in presence of an aqueous solution of an alkaline reacting substance and a protective colloid capable of swelling with water and separating the hydrazine formed from the reaction mixture.

2. A method for making hydrazine which consists in heating urea with an alkali metal hypochlorite in presence of an aqueous solution of an alkaline reacting substance and a protective colloid capable of swelling with water and separating the hydrazine formed from the reaction mixture.

3. A method for making hydrazine which consists in heating urea with sodium hypochlorite in presence of an aqueous solution of an alkaline reacting substance and a protective colloid capable of swelling with water and separating the hydrazine formed from the reaction mixture.

4. A method for making hydrazine which consists in heating urea with sodium hypochlorite in presence of an aqueous solution of sodium hydroxide and a protective colloid capable of swelling with water and separating the hydrazine formed from the reaction mixture.

5. A method for making hydrazine which consists in heating urea with sodium hypochlorite in presence of an aqueous solution of sodium hydroxide and glue and separating the hydrazine formed from the reaction mixture.

6. A method for making hydrazine which consists in heating urea with sodium hypochlorite in presence of an aqueous solution of potassium hydroxide and a protective colloid capable of swelling with water and separating the hydrazine formed from the reaction mixture.

7. A method for making hydrazine which consists in heating urea with sodium hypochlorite in presence of an aqueous solution of potassium hydroxide and glue and separating the hydrazine formed from the reaction mixture.

8. A method for making hydrazine which consists in heating urea with an alkali metal hypochlorite in presence of an aqueous solution of an alkaline reacting substance and a protective colloid capable of swelling with water and selected from a group consisting of albumin, glue, gelatine, agar-agar, and colloidal decomposition products thereof.

9. A method of making hydrazine sulphate comprising preparing a mixture of 30 parts by weight of urea, 50 parts of sodium hydroxide in 120 parts of water at a temperature of about 0° C., dissolving 1 part of glue in 10 parts of water and adding the solution to the mixture, preparing a solution of 37 parts of sodium hypochlorite in 250 parts of water and adding this solution to the last obtained mixture, heating the total mixture to about 100° C., cooling, and precipitating hydrazine sulphate from the liquid by adding thereto an excess of dilute sulphuric acid.

OTTO SEUFFERT.
EGON IHWE.